United States Patent [19]

Takehara et al.

[11] Patent Number: 5,324,451
[45] Date of Patent: Jun. 28, 1994

[54] LACTIC ACID DERIVATIVES AND LIQUID CRYSTAL COMPOSITIONS CONTAINING THE SAME

[75] Inventors: Sadao Takehara; Tadao Shoji; Hiroshi Ogawa, all of Chiba; Toru Fujisawa, Saitama; Masashi Osawa, Chiba, all of Japan

[73] Assignees: Dainippon Ink and Chemicals, Inc., Tokyo; Kawamura Institute of Chemical Research, Chiba, both of Japan

[21] Appl. No.: 870,743

[22] Filed: Apr. 20, 1992

Related U.S. Application Data

[63] Continuation of Ser. No. 311,310, Feb. 16, 1989, abandoned.

[30] Foreign Application Priority Data

Feb. 18, 1988 [JP] Japan .................................. 63-33922
Apr. 4, 1988 [JP] Japan .................................. 63-81328

[51] Int. Cl.$^5$ ...................... C09K 19/12; C09K 19/20; C07C 69/76
[52] U.S. Cl. ........................... 252/299.65; 252/299.66; 252/299.67; 560/65; 560/59; 560/73; 560/80; 560/102
[58] Field of Search ...................... 252/299.67, 299.66, 252/299.65; 560/59, 65, 73, 80, 102

[56] References Cited

U.S. PATENT DOCUMENTS

| | | | |
|---|---|---|---|
| 4,448,492 | 5/1984 | Huffman | 252/299.01 X |
| 4,613,209 | 9/1986 | Goodby et al. | 350/350 S |
| 4,753,752 | 6/1988 | Raynes et al. | 252/299.65 |
| 4,844,597 | 7/1989 | Katagiri et al. | 359/103 X |
| 4,866,199 | 9/1989 | Shibata et al. | 560/65 |
| 4,892,675 | 1/1990 | Nohira et al. | 252/299.01 |
| 4,923,633 | 5/1990 | Gray et al. | 252/299.65 |
| 5,188,815 | 2/1993 | Coates et al. | 424/7.1 |

FOREIGN PATENT DOCUMENTS

| | | |
|---|---|---|
| 0136845 | 3/1986 | European Pat. Off. . |
| 0188222 | 7/1986 | European Pat. Off. . |
| 0191600 | 8/1986 | European Pat. Off. . |
| 8705017 | 8/1987 | World Int. Prop. O. . |

Primary Examiner—Robert L. Stoll
Assistant Examiner—C. Harris
Attorney, Agent, or Firm—Armstrong, Westerman, Hattori, McLeland & Naughton

[57] ABSTRACT

A compound represented by formula (I):

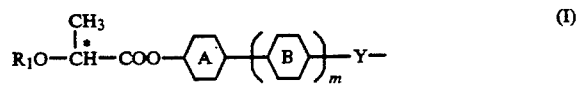

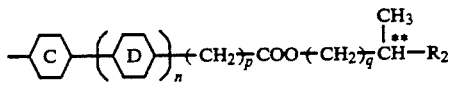

wherein $R_1$ represents an alkyl group having from 1 to 18 carbon atoms; $R_2$ represents an alkyl group having from 2 to 16 carbon atoms; rings A, B, C, and D each represents a 1,4-phenylene group or a 1,4-phenylene group having one or two halogen atoms; Y represents a single bond,

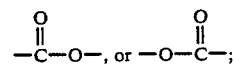

m and n each represents 0 or 1; p represents 0, 1, or 2; q represents 0 or an integer of from 1 to 6; and C* and C** each represents an asymmetric carbon atom in an (S)- or (R)-configuration, and a liquid crystal composition containing the compound of formula (I). The compound of formula (I) is a chiral liquid crystal compound exhibiting large spontaneous polarization, a long helical pitch, an SC* phase in a broad temperature range including room temperature, satisfactory orientation, and a high rate of response.

32 Claims, No Drawings

LACTIC ACID DERIVATIVES AND LIQUID CRYSTAL COMPOSITIONS CONTAINING THE SAME

This application is a continuation of U.S. application Ser. No. 311,310 filed Feb. 16, 1989, abandoned.

FIELD OF THE INVENTION

This invention relates to novel lactic acid derivatives useful as optoelectronic display materials and liquid crystal compositions containing the same. More particularly, it relates to ferroelectric liquid crystal materials which exhibit excellent response and memory characteristics as compared with conventional liquid crystal materials and is promising for use in liquid crystal devices.

BACKGROUND OF THE INVENTION

Liquid crystal display elements now widespread chiefly employ a TN (twisted nematic) type display mode utilizing nematic liquid crystals. Under the state of the art, although a TN type display system offers many merits and advantages, it has considerably lower rates of response as compared with light-emission type display systems, such as a cathode ray tube (CRT). Studies on liquid crystal display systems other than the TN type mode have been made, but satisfactory improvements on response characteristics have not been reached.

In recent years, it has been turned out that liquid crystal devices utilizing ferroelectric smectic liquid crystals make it possible to obtain rates of response 100 to 1,000 times higher than those conventionally obtained and to obtain memory of display even after cut-off of an electric source because of bistability (memory effects). This means a great possibility of application to light shutters, printer heads, panel type television sets, etc., and extensive investigations are now being made to establish practical application in various fields.

The liquid crystal phase of ferroelectric liquid crystals belongs to a tilt type chiral smectic phase. Preferred of chiral smectic phases in view of practical use is a phase called chiral smectic C phase (hereinafter referred to SC* phase) having the lowest viscosity.

Liquid crystal compounds exhibiting an SC* phase (hereinafter referred to as SC* compounds) have hitherto been studied, and a number of compounds of this type have been synthesized. However, none of these SC* compounds, when used alone, does not satisfy all of the characteristics required for use as a light switching element for ferroelectric liquid crystal display. That is, the ferroelectric liquid crystal compound is required to have (1) ferroelectricity in a broad temperature range including room temperature, (2) an appropriate phase series in a high temperature region, (3) a long helical pitch, particularly in a chiral nematic phase (hereinafter referred to N* phase), (4) an appropriate tilt angle, (5) low viscosity, and (6) a fairly large spontaneous polarization value (hereinafter referred to as PS value), and to exhibit (7) satisfactory orientation owing to the characteristics (2) and (3), and (8) high rate of response owing to the characteristics (5) and (6).

Hence, under the present circumstances, SC* liquid crystal compositions are used for studies and the like.

SC* liquid crystal compositions are generally prepared by doping a liquid crystal compound or composition (hereinafter referred to as a mother liquid crystal) which shows no ferroelectric properties and exhibits non-chiral smectic C phase (hereinafter referred to as SC) with one or more kinds of chiral compounds (hereinafter referred to as a chiral dopant). According to this technique, however, unless the chiral dopant to be added exhibits considerably large spontaneous polarization, the resulting SC* liquid crystal composition shows too small spontaneous polarization to have a high response rate.

The chiral dopant is not always required to show a liquid crystal phase. However, in order not to make the liquid crystal temperature range of the composition narrow, it is desirable that the chiral dopant exhibits a liquid crystal phase, preferably a chiral smectic phase (hereinafter referred to as SX), and particularly, if possible, an SC* phase, up to a high temperature region. Further, many of liquid crystal compounds capable of exhibiting large spontaneous polarization give a strong twisting force to the liquid crystal phase, thus reducing the helical pitch in phases where a helix appears, i.e., SC* and N* phases, which adversely influences orientation of the liquid crystal compounds. Therefore, when such a liquid crystal compound is used as a chiral dopant, it has been necessary to limit the amount to be added or to control the helical pitch of the SC* liquid crystal composition by addition of a chiral compound which shows twisting in the opposite direction. However, control of the helical pitch has encountered with troublesome problems. For example, if the chiral compound shows twisting in the opposite direction, the direction of spontaneous polarization would also be opposite to offset the spontaneous polarization of the chiral dopant.

For these reasons, it has been demanded to develop a chiral liquid crystal compound which shows spontaneous polarization as large as possible, has a large helical pitch, and exhibits an SC* phase by itself.

SUMMARY OF THE INVENTION

Accordingly, one object of this invention is to provide a chiral crystal compound which exhibits extremely large spontaneous polarization, an extremely large helical pitch particularly in an N* phase, an SC* phase in a broad temperature range including room temperature, satisfactory orientation, and a high rate of response, either alone or when added to a mother liquid crystal as a chiral dopant.

It has now been found that the above object of this invention can be accomplished by compounds represented by formula (I)

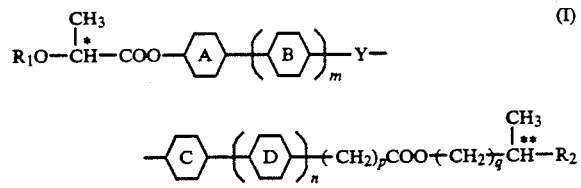

wherein $R_1$ represents an alkyl group having from 1 to 18 carbon atoms; $R_2$ represents an alkyl group having from 2 to 16 carbon atoms; rings A, B, C, and D each represents a 1,4-phenylene group or a 1,4-phenylene group having one or two halogen atoms (preferably fluorine); Y represents a single bond,

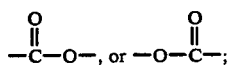

m and n each represents 0 or 1; p represents 0, 1, or 2; q represents 0 or an integer of from 1 to 6; and C* and C** each represents an asymmetric carbon atom in an (S)- or (R)-configuration.

DETAILED DESCRIPTION OF THE INVENTION

In formula (I), the alkyl group as represented by $R_1$ preferably contains from 2 to 8 carbon atoms for ensuring large spontaneous polarization and low viscosity.

The ring A preferably represents

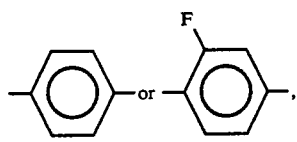

the rings B and D each preferably represents

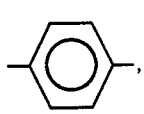

and the ring C preferably represents

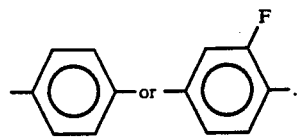

The compound of formula (I) is preferably a tricyclic compound wherein m+n=1. The bicyclic compound of formula (I) wherein m=n=0 has reduced liquid crystal properties, and the tetracyclic compound of formula (I) wherein m=n=1 has an increased viscosity.

The compound of formula (I) can be prepared, for example, as follows.

(A) Preparation of Compound (I) wherein Y is

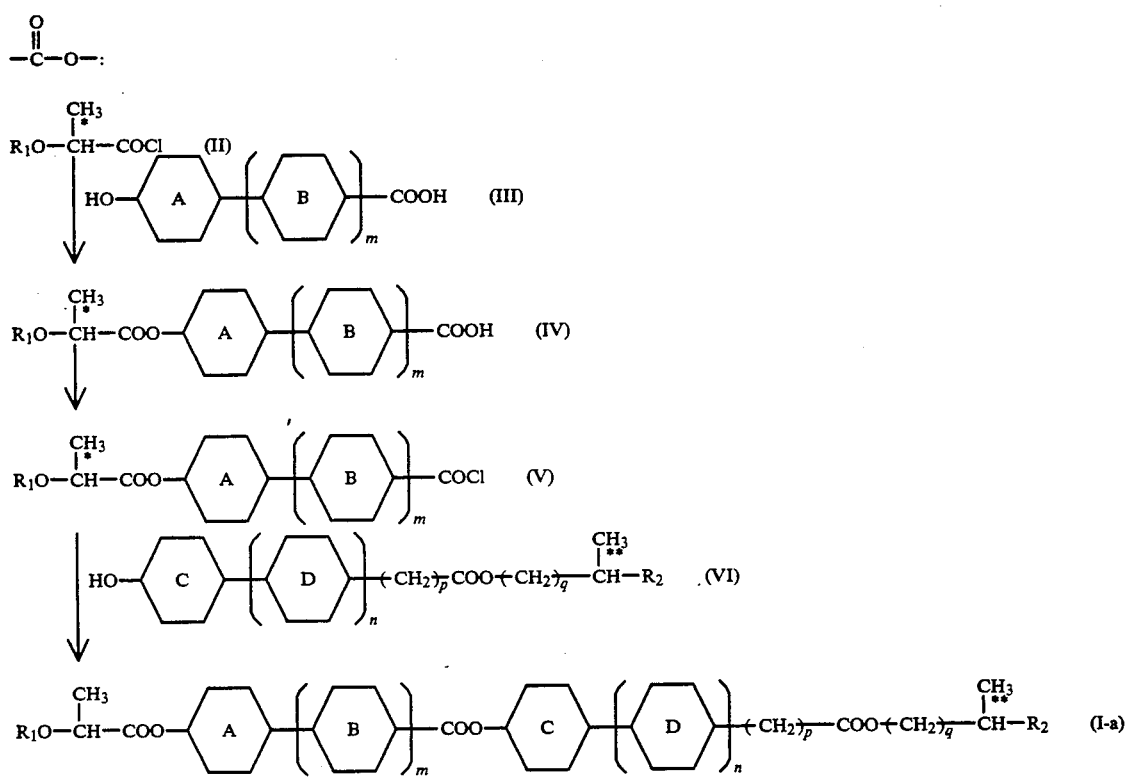

wherein $R_1$, $R_2$, m, n, p, q, rings A, B, C, and D, C*, and C** are defined above.

A lactic acid chloride represented by formula (II) is reacted with a hydroxycarboxylic acid represented by formula (III) in the presence of pyridine, etc. to obtain a carboxylic acid represented by formula (IV). The acid of formula (IV) is converted to an acid chloride represented by formula (V) by reaction with thionyl chloride, etc., and the acid chloride is then reacted with an optically active alcohol ester of a hydroxycarboxylic acid represented by formula (VI) to prepare a compound of formula (I-a), i.e., the compound of formula (I) wherein Y is

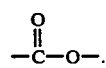

The compound of formula (I-a) can also be prepared by direct esterification between the compound of formula (IV) and the compound of formula (VI) in the presence of a dehydrating condensation agent, such as dicyclohexylcarbodiimide.

The lactic acid derivative of formula (II) can be prepared by alkylating ethyl lactate with an alkyl iodide and silver oxide, hydrolyzing the product, and chlorinating the carboxyl group of the hydrolyzate with thionyl chloride.

The optically active alcohol ester of a hydroxycarboxylic acid of formula (VI) can be prepared directly by dehydrating esterification between a hydroxycarboxylic acid represented by formula (VII):

wherein $R_2$, q, and $C^{**}$ are as defined above, in the presence of an acid catalyst.

The compound of formula (VI) can also be obtained by converting the hydroxycarboxylic acid of formula (VII) having its hydroxyl group protected to an acid chloride thereof, reacting the acid chloride with the optically active alcohol of formula (VIII) to form an ester, and then removing the protective group.

Most of the hydroxycarboxylic acids of formula (VII), particularly those wherein p=0, are known per se, and some of them are commercially available. They can be easily synthesized through the following steps.

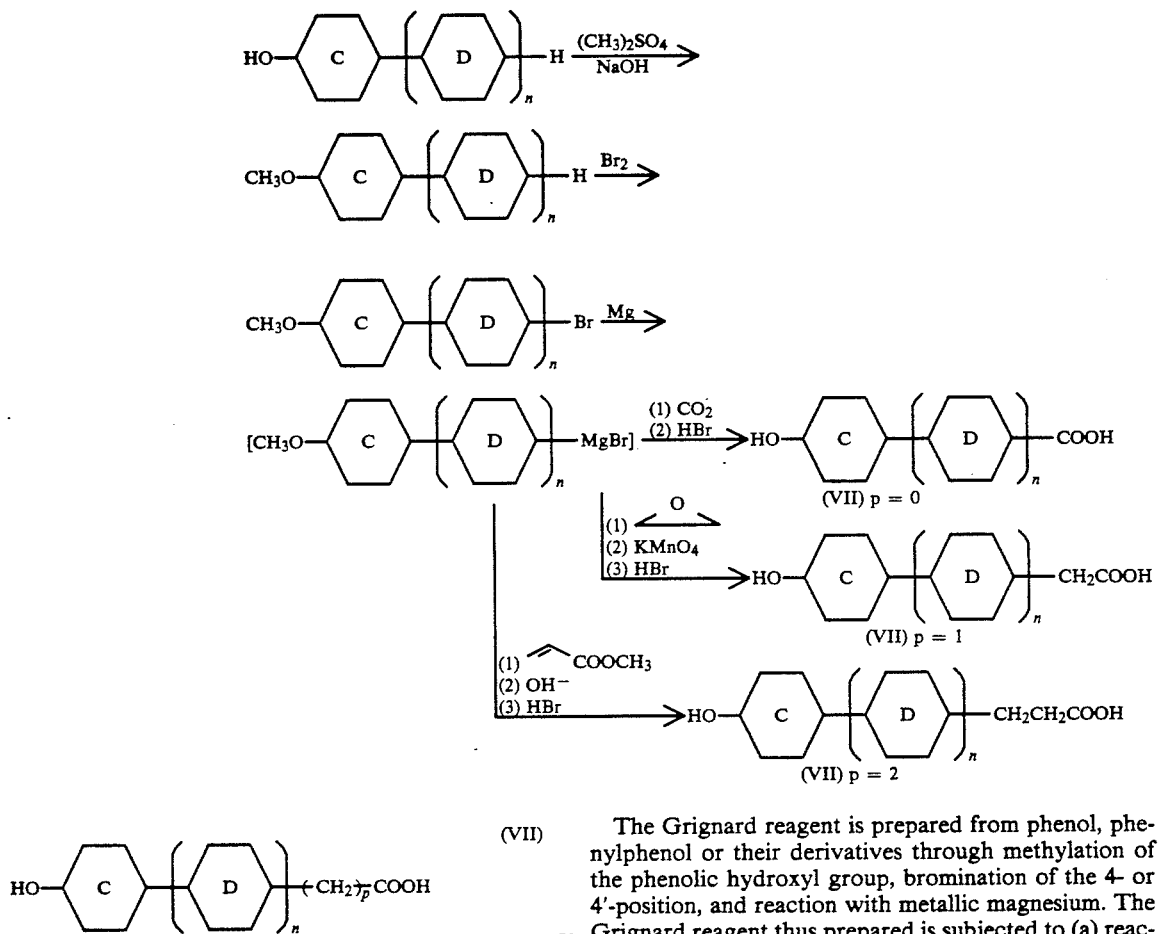

wherein rings C and D, n, and p are as defined above, and an optically active alcohol represented by formula (VIII):

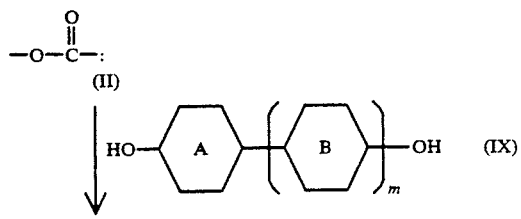

The Grignard reagent is prepared from phenol, phenylphenol or their derivatives through methylation of the phenolic hydroxyl group, bromination of the 4- or 4'-position, and reaction with metallic magnesium. The Grignard reagent thus prepared is subjected to (a) reaction with carbon dioxide, or (b) reaction with ethylene oxide, followed by oxidation, or (c) reaction with an acrylic ester in the presence of a copper compound, followed by hydrolysis to thereby obtain a carboxylic acid wherein p is 0, 1, or 2, respectively. The methyl group is then removed therefrom to obtain the compound of formula (VII).

(B) Preparation of Compound (I) wherein Y is $$-O-\overset{O}{\underset{\|}{C}}-:$$ (II)

$$HO-\underset{\phantom{x}}{\overset{\phantom{x}}{\bigcirc}}_{A}\left(\overset{\phantom{x}}{\underset{\phantom{x}}{\bigcirc}}_{B}\right)_m-OH \quad (IX)$$

↓

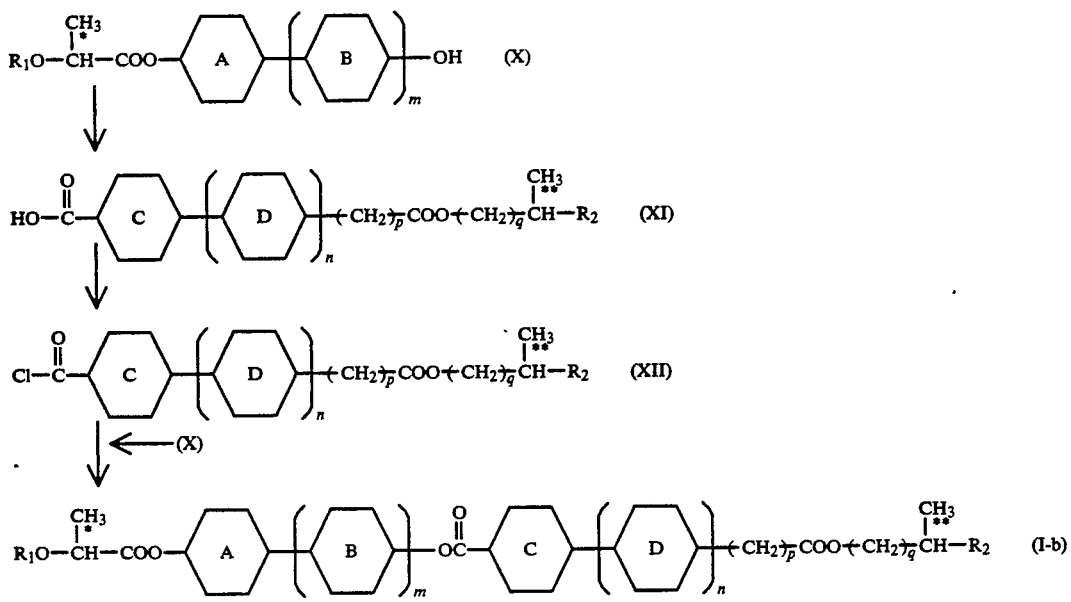

The lactic acid derivative of formula (II) is reacted with hydroquinone or 4,4'-biphenol or a substitute thereof represented by formula (IX) to prepare a phenol derivative represented by formula (X). Separately, a dicarboxylic acid monoester represented by formula (XI) is converted to its acid chloride represented by formula (XII), which is then reacted with the phenol derivative of formula (X) to obtain a compound of formula (I-b), i.e., the compound of formula (I) wherein Y is —OCO—.

The compound of formula (I-b) may also be obtained by directly esterifying the compound of formula (X) and the compound of formula (XI) by condensation in the presence of a dehydrating agent.

The compounds of formula (IX), some of which are commercially available, can be prepared by treating the corresponding acetyl compound with performic acid, followed by demethylation as illustrated by the following reaction scheme.

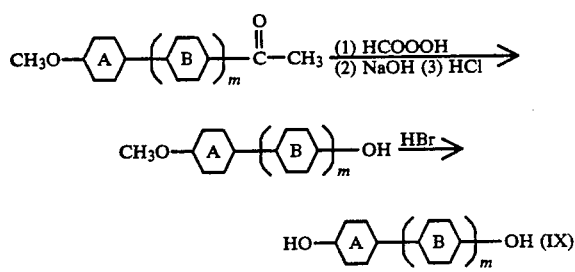

The dicarboxylic acid monoester of formula (XI) or its acid chloride of formula (XII) can be prepared by the following reactions:

(a)

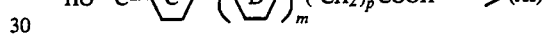

The corresponding dicarboxylic acid is directly monoesterified to obtain the compound of formula (XI) wherein $p=0$.

(b)

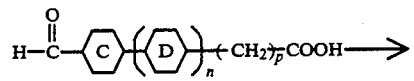

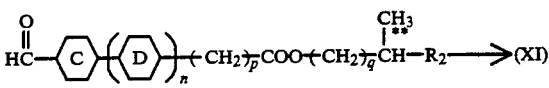

The corresponding formylcarboxylic acid is esterified, and the formyl group is oxidized.

(c)

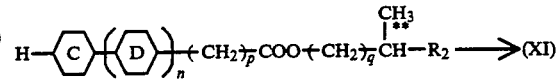

A carboxyl group is introduced to the corresponding optically active ester.

Typical examples of the compounds of formula (I) are shown in Table 1 together with their transition temperature, the direction of induced helix, and the direction of spontaneous polarization. Determination of the liquid phase and phase transition temperature were carried out by a combined use of a polarizing microscope equipped with a temperature control stage and a differential scanning calorimeter (DSC). It should be noted that the transition temperatures are subject to slight variation depending on the purity of samples or conditions of measurements. The purity of the compound was confirmed by thin layer chromatography, gas chromatography, and high pressure liquid chromatography.

TABLE 1

$$R_1O-\overset{*}{\underset{CH_3}{CH}}-COO-\left(A\right)_m-Y-\left(B\right)_n-\left(C\right)-\left(D\right)_p-(CH_2)_p-COO-(CH_2)_q-\overset{**}{\underset{CH_3}{CH}}-R_2$$

| Compound No. | R₁ | A | m | B | Y | C | n | D | p | q | R₂ | Absolute Configuration (C*) | (C**) | Phase and Phase Transition Temperature | | | | | | Direction of Helix | Direction of Spontaneous Polarization |
|---|---|---|---|---|---|---|---|---|---|---|---|---|---|---|---|---|---|---|---|---|---|
| | | | | | | | | | | | | | | C | SX | SC* | SA | N* | I | | |
| 1 | n-C₃H₇— | ⬡ | 1 | ⬡ | —COO— | ⬡ | 0 | — | 0 | 0 | n-C₆H₁₃ | (S) | (S) | .74.0 | # | · | (.52.5) | · | · | left | + |
| 2 | n-C₃H₇— | ⬡ | 1 | ⬡ | —COO— | ⬡(F) | 0 | — | 0 | 0 | n-C₆H₁₃ | (S) | (S) | * | .14.0 | · | .40.0 | · | · | left | + |
| 3 | n-C₃H₇— | ⬡ | 1 | ⬡ | —COO— | ⬡ | 0 | — | 0 | 0 | n-C₆H₁₃ | (S) | (R) | .62.5 | # | · | (.60.0) | · | · | right | + |
| 4 | n-C₃H₇— | ⬡ | 0 | — | —COO— | ⬡ | 1 | ⬡ | 0 | 0 | n-C₆H₁₃ | (S) | (S) | .70.5 | · | · | (.32.0) | · | · | left | + |
| 5 | n-C₈H₁₇— | ⬡(F) | 0 | — | —COO— | ⬡ | 1 | ⬡ | 0 | 0 | n-C₆H₁₃ | (S) | (S) | .36.0 | # | · | · | · | · | left | + |
| 6 | n-C₃H₇— | ⬡ | 1 | ⬡ | —OCO— | ⬡ | 0 | — | 0 | 0 | n-C₆H₁₃ | (S) | (S) | .74.0 | · | · | (.49.0) | · | · | left | + |
| 7 | n-C₃H₇— | ⬡ | 0 | — | single bond | ⬡ | 0 | — | 0 | 0 | n-C₆H₁₃ | (S) | (S) | * | · | · | · | · | · | left | + |
| 8 | n-C₃H₇— | ⬡ | 0 | — | single bond | ⬡ | 0 | — | 0 | 0 | n-C₄H₉ | (S) | (S) | * | · | · | · | · | · | left | + |
| 9 | n-C₃H₇— | ⬡ | 1 | ⬡ | —COO— | ⬡ | 0 | — | 0 | 1 | —C₂H₅ | (S) | (S) | .53.5 | · | .62.0 | .126.0 | .141.0 | · | right | + |
| 10 | n-C₃H₇— | ⬡ | 1 | ⬡ | —COO— | ⬡(F) | 0 | — | 0 | 1 | —C₂H₅ | (S) | (S) | .38.0 | · | .66.0 | .110.5 | .111.5 | · | right | + |

TABLE 1-continued $$R_1O-\overset{CH_3}{\underset{|}{CH}}-COO-\boxed{A}+\boxed{B}\overset{}{\rightarrow}_m Y+\boxed{C}+\boxed{D}\overset{}{\rightarrow}_n(CH_2)_p COO+CH_2)_q \overset{CH_3}{\underset{|**}{CH}}-R_2$$

| Compound No. | $R_1$ | A | m | B | Y | C | n | D | p | q | $R_2$ | Absolute Centrifugation (C*) (C**) | | Phase and Phase Transition Temperature | | | | | | Direction of Helix | Direction of Spontaneous Polarization |
|---|---|---|---|---|---|---|---|---|---|---|---|---|---|---|---|---|---|---|---|---|---|
| | | | | | | | | | | | | | | C | SX | SC* | SA | N* | I | | |
| 11 | n-$C_3H_7$— | ⬡ | 0 | — | —COO— | ⬡ | 1 | — | 0 | 1 | —$C_2H_5$ | (S) | (S) | .59.5 | . | .81.5 | .94.5 | .103.0 | . | right | + |
| 12 | n-$C_3H_7$— | ⬡ | 0 | — | —COO— | ⬡ | 0 | — | 0 | 1 | —$C_2H_5$ | (S) | (S) | * | . | . | . | . | . | right | + |
| 13 | n-$C_3H_7$— | ⬡ | 1 | ⬡ | —COO— | ⬡ | 0 | — | 1 | 1 | —$C_2H_5$ | (S) | (S) | .88.0 | (.75) | . | . | . | . | right | + |
| 14 | n-$C_3H_7$— | ⬡ | 1 | ⬡ | —COO— | ⬡ | 0 | — | 2 | 1 | —$C_2H_5$ | (S) | (S) | .64.0 | . | (.60.5) | .73.5 | . | . | right | + |
| 15 | n-$C_3H_7$— | ⬡ | 0 | — | —COO— | ⬡ | 1 | ⬡ | 0 | 1 | -n-$C_6H_{13}$ | (S) | (S) | .40.5 | . | .62.5 | .89.5 | .91.0 | . | right | + |
| 16 | n-$C_3H_7$— | ⬡ | 1 | ⬡ | —OCO— | ⬡ | 0 | — | 0 | 1 | —$C_2H_5$ | (S) | (S) | .57.0 | . | .98.0 | .112.0 | .115.5 | . | right | + |
| 17 | n-$C_3H_7$— | ⬡ | 1 | ⬡ | —COO— | ⬡ | 0 | — | 0 | 2 | —$C_2H_5$ | (S) | (S) | .74.0 | . | .80.0 | .114.5 | . | . | right | + |
| 18 | n-$C_3H_7$— | ⬡ | 0 | — | single bond | ⬡ | 0 | — | 0 | 2 | —$C_2H_4$ | (S) | (S) | * | . | . | . | . | . | right | + |

Note:
C: crystal phase
SX: chiral smectic phase
SC*: chiral smectic C phase
SA: smectic A phase
N*: chiral nematic phase
I: isotropic liquid phase
point (.) indicates existence of the phase; hyphen (-) indicates that the phase does not exist or is not confirmed; figure at the right of the point is a transition temperature to a phase of a higher temperature region; parentheses indicates that the phase is monotropic; point (.) indicates existence of the phase which is induced on addition to a liquid crystal exhibiting a nematic phase; mark # indicates that the phase can be confirmed under quenching, but precise measurement of the transition temperature is impossible due to crystallization (the transition temperatures of Compound Nos. 1 and 3 are around and between 10° C. and 15° C.); asterisk (*) indicates that the melting point is vague because the compound is not crystallized even on allowing to cool for a long period of time.

The greatest structural feature of the compounds of formula (I) lies in that there are two asymmetric carbon atoms per molecule, which are separated apart by the core. The 2-alkoxypropanoyloxy group containing one of the asymmetric carbon atoms is derived from lactic acid and its ester and has an (R)- or (S)-configuration; while the 1-methylalkoxycarbonyl group containing the other asymmetric carbon atom is derived from an optically active 2-alkanol and has a steric configuration selected from (R) and (S).

It is known that some of liquid crystal compounds containing the above-described optically active groups exhibit strong spontaneous polarization. The present inventors have confirmed through their studies that some of those containing a 2-alkoxypropanoyloxy group have PS values of from 100 to 150 nC/cm² and some of those containing a 1-methylalkoxycarbonyl group have PS values of about 100 nC/cm² as reported in 11th *Ekisho Toronkai Yokoshu* (*JAPAN*), p. 172. However, as stated above, these optically active liquid crystal compounds are preferably added to SC mother liquid crystal compositions in a small amount usually of from about 5% to about 30% by weight. In such cases, the PS value of the resulting SC* liquid crystal compositions is extremely low. PS values of about 100 to 150 nC/cm² of these known compounds are hence regarded insufficient. In addition, these optically active liquid crystal compounds have strong helically twisting force.

The inventors noted that, taking the direction of spontaneous polarization of (S)-2-methylbutyl p-decyloxybenzylideneaminocinnamate, a well-known ferroelectric liquid crystal, as "minus", the direction of spontaneous polarization assigned to the 2-alkoxypropanoyloxy group

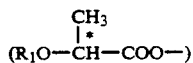

is "plus" or "minus" when the absolute configuration of its asymmetric carbon atoms C* is (S) or (R), respectively, and the direction of induced helix is right or left in (S) or (R), respectively; and that the direction of spontaneous polarization assigned to the 1-methylalkoxycarbonyl group

is "plus" or "minus" with the absolute configuration of C** being (S) or (R), respectively, and the direction of induced heix is left or right in (S) or (R), respectively. The inventors thus expected that a proper combination of C* and C**, i.e., a combination of (S) and (S) or a combination of (R) and (R), in compounds containing both 2-alkoxypropanoyloxy and 1-methylalkoxycarbonyl groups per molecule would reduce the twisting force through offsetting, while adding greatly to the spontaneous polarization. The present invention has been completed based on these thoughts.

In evaluation of spontaneous polarization of the compound of formula (I), since the compound does not always exhibit a stable SC* phase when used alone, it was added to an SC mother liquid crystal composition exhibiting an SC phase, and a PS value of the resulting SC* liquid crystal composition was measured, and the measured value was compared with that of an SC* liquid crystal composition similarly prepared by using an SC* compound whose PS value is known. For example, 4-[(S)-1-methylheptyloxy]-phenyl 4'-[(S)-2-methylbutanoyloxy]-biphenyl-4-carboxylate, which is a compound previously developed by the inventors, exhibits an SC* phase and has a PS value of 110 nC/cm² by itself at $T_c-T=25°$ C., wherein $T_c$ is an upper limit of the SC* phase (hereinafter the same). When this compound was added to a pyrimidine-phenylbenzoate-based SC liquid crystal composition [hereinafter referred to as SC mother liquid crystal (A)] in a proportion of 10% by weight, the resulting SC* liquid crystal composition had a PS value of 1.6 nC/cm² at $T_c-T=25°$ C. On the other hand, an SC* liquid crystal composition prepared by adding 4-[(S)-1-methylheptyloxycarbonyl]phenyl 4'-[(S)-2-propoxypropanoyloxy] biphenyl-4-carboxylate (Compound No. 1) according to the present invention to the SC mother liquid crystal (A) in the same proportion had a PS value of 8.7 nC/cm² at $T_c-T=25°$ C., 5 or more times the above-recited PS value.

PS values of SC* liquid crystal compositions containing Compound No. 1 in varied concentrations were measured, and the results obtained were extrapolated to find that the spontaneous polarization induced by this compound corresponds to a PS value of from 400 to 500 nC/cm² on a conversion to a single compound.

On the other hand, spontaneous polarization of 4-[(R)-1-methylheptyloxycarbonyl]phenyl 4'-[(S)-2-propoxypropanoyloxy]biphenyl-4-carboxylate (Compound No. 3), in which the directions of spontaneous polarization assigned to the two optically active groups are different from each other, was determined in the same manner as described above and was found to be very low as 0.2 nC/cm² or less at $T_c-T=25°$ C.

The mother liquid crystal (A) used in the measurements had the following composition:

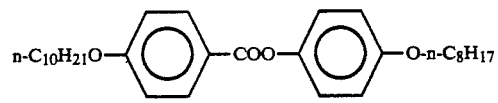

10 wt. %

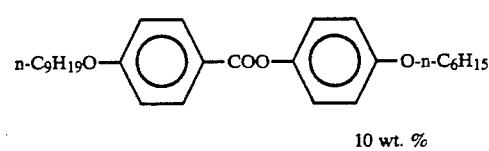

10 wt. %

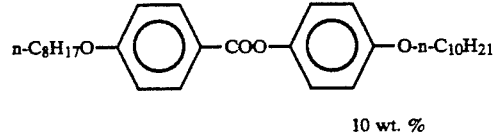

10 wt. %

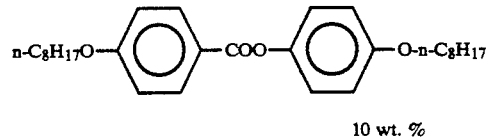

10 wt. %

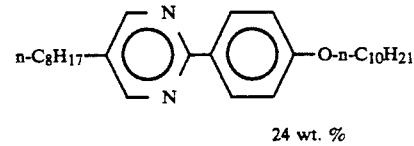

24 wt. %

-continued

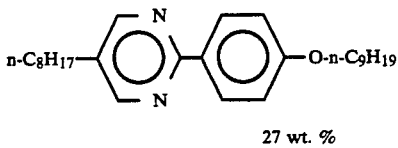

27 wt. %

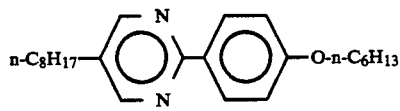

6 wt. %

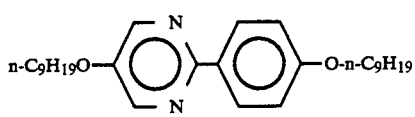

3 wt. %

Phase transition temperatures of the mother liquid crystal (A) are shown below.

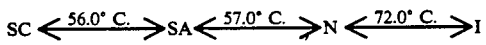

An SC* liquid crystal composition consisting of 85% by weight of the SC mother liquid crystal (A) and 15% by weight of Compound No. 1 had a left-handed helix having a pitch of 1.67 μm in the N* phase at a temperature higher than the N*-SA transition point by 0.5° C. An SC* liquid crystal composition consisting of 90% by weight of the SC mother liquid crystal (A) and 10% of Compound No. 6 had a left-handed helix having a pitch of 2.40 μm. To make a marked contrast, an SC* liquid crystal composition consisting of 90% by weight of the SC mother liquid crystal (A) and 10% by weight of Compound No. 3 in which the directions of helix are not mutually offset showed a right-handed helix having a small pitch of 0.83 μm, clearly demonstrating the effects of combining an SC liquid crystal and the compound of formula (I) in such a manner that their helices may have opposite directions.

Compound No. 10 of formula:

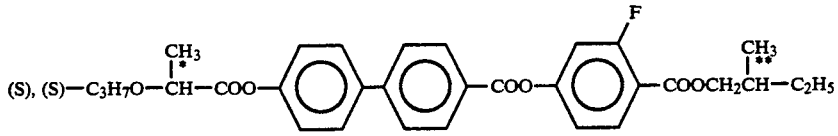

exhibits an N* phase on cooling to 111.5° C., an SA phase at 110.5° C., and an SC* phase at 66° C., and keeps the SC* phase till cooled to room temperature or even lower. On standing at low temperatures for a long time, the compound forms crystals whose melting point is 38° C. The pitch in the N* phase is very long, particularly at a temperature near the N*-SA transition point (20 μm or more). Because of the long helical pitch combined with the existence of an SA phase, the compound can easily be orientated. Compound No. 10 was found to have a PS value of 97 nC/cm² or 146 nC/cm² at a temperature lower than the SA-SA* transition point by 10° C. or 30° C., respectively; a response rate of 104 μsec at 28° C.; and an tilt angle of 33.8° at that time.

Thus, when compared as a single compound, Compound No. 10 proves superior to any of known SC* compounds in any respect.

Compound No. 11 of formula:

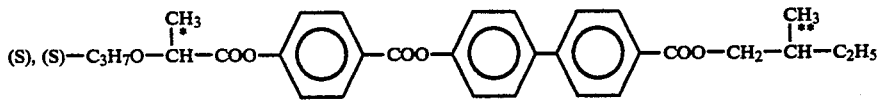

was added to the SC mother liquid crystal(A) in a proportion of 25% by weight. The resulting SC* liquid crystal composition was found to have very high rates of response, i.e., 51 μsec at 30° C. and 63 μsec at 25° C. The composition exhibited an SC* phase at 59° C. or lower; an SA phase at 66.5° C. or lower, and an N* phase at 74° C. or lower. Considering that the upper limit of the SC phase ($T_c$) of the mother liquid crystal (A) is 56° C., Compound No. 11 proves effective to broaden the temperature range for the SC* phase. The SC* composition had a pitch of about 4 μm at 70° C. in its N* phase, showing satisfactory orientation.

When Compound No. 11 was added to another pyrimidine-phenylbenzoate-based SC liquid crystal composition, whose composition is shown below, [hereinafter referred to as mother liquid crystal (B)] in a proportion of 25% by weight to prepare an SC* liquid crystal composition, the rate of response was further improved to 35 μsec at 25° C. The resulting composition exhibited an SC* phase at 70° C. or lower, an SA phase at 84° C. or lower, and an N* phase at 104° C. or lower, proving that Compound No. 11 broadens a temperature range for the SC* phase.

Compound No. 11 was found to have a PS value of 105 nC/cm² at $T_c-T=10°$ C. and 180 nC/cm² at $T_c-T=30°$ C.

The mother liquid crystal (B) used above consisted of 65% by weight of

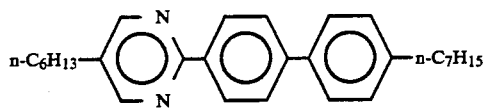

and 35% by weight of

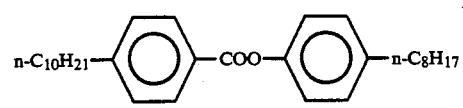

and had phase transition temperatures shown below.

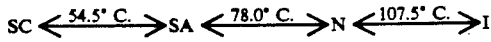

The above-described results establish the relations among absolute configurations of C* and C**, spontaneous polarization (degree and direction), and helical pitch (length and direction) as tabulated below.

TABLE 2

| Absolute Configuration | | Spontaneous Polarization | | Helical Pitch | |
|---|---|---|---|---|---|
| C* | C** | Degree | Direction | Length | Direction |
| (S) | (S) | great | ⊕ | medium to long | left |
| (S) | (R) | small to medium | ⊕ | short | right |

It is apparent that a combination of (R), (R) or a combination of (R), (S) as absolute configurations of C* and C** is equal to the combination of (S), (S) or a combination (S), (R), respectively, in degree of spontaneous polarization and length of helical pitch, only differing in directions of spontaneous polarization and helical pitch. Therefore, considerations for only the two combinations of Table 2 would suffice to study all the combinations.

It can be seen from Table 2 that the direction of spontaneous polarization is determined by the absolute configuration of the asymmetric carbon C* of the 2-propoxypropanoyloxy group. This is believed to be because spontaneous polarization induced by the 2-propoxypropanoyloxy group is larger than that induced by the 1-methylheptoxycarbonyl group. It can also be seen that the direction of helix is determined by the absolute configuration of the asymmetric carbon C** of the 1-methylheptoxycarbonyl group. This is believed to be because the 1-methylheptoxycarbon group has, in turn, a greater force to induce helical twisting than the 2-propoxypropanoyloxy group.

Taking these considerations into account, an SC* liquid crystal composition having a desired PS value and a desired direction of helical pitch can be obtained easily by varying the combination of absolute configurations of C* and C**. This is of markedly great worth for preparing SC* liquid crystal compositions having excellent response and orientation characteristics.

In the case of an (S), (S) combination, one of preferred combinations, the PS value is high, the PS direction is ⊕, and the helical pitch is left-handed and relatively long, but these properties are sometimes insufficient. Such being the case, addition of a small amount of a compound whose helical pitch is right-handed suffices for compensation. Whether the direction of spontaneous polarization of the compound whose helical pitch is right-handed is ⊕ or ⊖ gives rise to no problem as long as the absolute PS value is small enough. In particular, it is possible to increase a helical pitch without reducing the PS value by using 4-[(R)-1--methylheptyloxy]phenyl 4-[(S)-2-prpoxypropanoyloxy]biphenyl-4-carboxylate, a compound previously disclosed by the inventors (Japanese Patent Application No. 62-204833), which exhibits large spontaneous polarization in the ⊕ direction [420 nC/cm² ($T_c-T=10°$)] and right-handed helical pitch or its analogous compound.

In general, introduction of a branched group into the side chain of liquid crystal molecules results in reduction of liquid crystal properties and reduction of phase transition temperatures. The compounds of formula (I) of the present invention in which a branched methyl group is present in the side chain on both sides show considerably lower phase transition temperatures as compared with those compounds having the similar structural skeleton. Accordingly, while tricyclic compounds of formula (I) wherein m+n=3 exhibits liquid crystal properties by themselves, bicyclic compounds wherein m=n=0 hardly exhibit liquid crystal phases by themselves.

Nevertheless, since the compounds of the present invention produce effects when added to an SC mother compound or composition to prepare an SC* liquid crystal composition, whether they exhibit liquid crystal properties by themselves or not does not cause great influences. In particular, the compounds of formula (I) exhibit a chiral smectic phase, though in low temperature regions, in many cases and, therefore, do not lower $T_c$ in the preparation of SC* liquid crystal compositions.

The SC liquid crystal compounds or compositions which can be mixed with the compound of formula (I) include bicyclic compounds represented by formula (C):

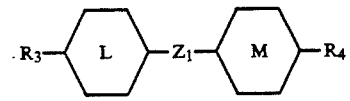

wherein $R_3$ and $R_4$, which may be the same or different, each represents alkyl, alkoxy, alkylcarbonyloxy, alkoxycarbonyl or alkoxycarbonyloxy group; $Z_1$ represents —COO—, —OCO—, —CH₂O, —OCH₂—, —CH₂CH₂—, —C≡C—, or a single bond; rings L and M each represents

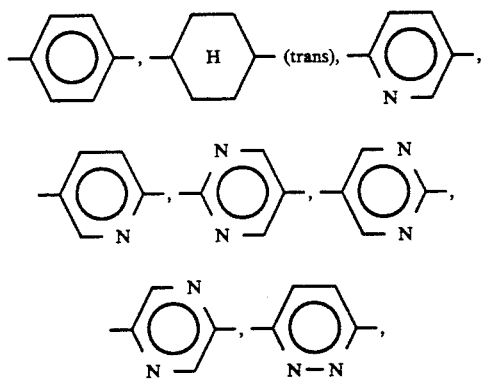

or a halogen substitute thereof.

More specifically, the bicyclic compounds of formula (C) include phenylbenzoate compounds represented by formula (A):

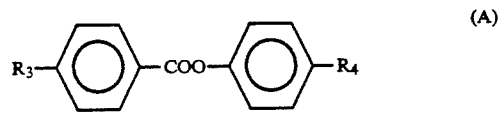

(A)

wherein $R_3$ and $R_4$ are as defined above, and pyrimidine compounds represented by formula (B):

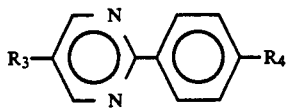 (B)

wherein $R_3$ and $R_4$ are as defined above.

In order to broaden the temperature range for an SC* phase of these compositions to a higher region, a tricyclic compound generally represented by formula (D) shown below can be employed.

 (D)

wherein $R_3$ and $R_4$ are as defined above; rings L, M, and N each represents

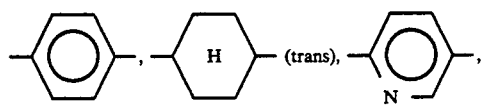

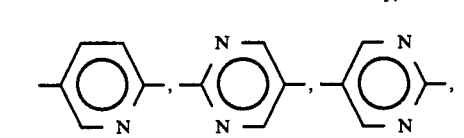

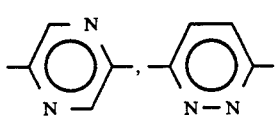

or a halogen substitute thereof; and $Z_1$ and $Z_2$ each represents —COO—, —OCO—, —CH$_2$O—, —OCH$_2$—, —CH$_2$—CH$_2$—, —C≡C—, or a single bond.

These compounds may be used either individually or in combinations of two or more thereof. The latter usage is advantageous for obtaining a broader temperature range.

In addition to the compounds of formulae (A) to (D), any of compounds which exhibit an SC phase, while containing a straight chain alkyl group in their side chain, may also be used.

Even when the compounds of formulae (A) to (D) or other compounds do not exhibit an SC phase by themselves, as long as they are liquid crystal compounds having low viscosity, it is effective to add them to the composition to reduce the viscosity of the composition for the purpose of increasing the rate of response. To this effect, compounds having an n-alkyl group in both side chains are particularly effective.

For use in a liquid crystal display cell, the resulting liquid crystal compound or composition according to the present invention is inserted as a thin film of uniform thickness (usually from about 1 μm to about 20 μm) between a pair of transparent electrode plates.

In the display cell, the liquid crystal should form a monodomain in which molecules are homogeneously and unidirectionally orientated, with their longer axes are parallel to the plane of electrodes. Such orientation can be usually achieved by gradually cooling the liquid crystals having an isotropic liquid phase (I) to have a liquid crystal phase after the electrode surface is subjected to alignment treatment, such as rubbing or vacuum evaporation or while applying an electric or magnetic field or a temperature gradient, or a combination of these treatments or conditions.

According to a method which has been frequently employed in recent years, a liquid crystal exhibiting a phase series of isotropic liquid phase (I) to chiral nematic phase (N*) to smectic A phase (SA) to chiral smectic C phase (SC*) is sealed up within a cell having been subjected to alignment treatment and aligned by increasing the helical pitch, particularly in the N* phase. This technique can be applied to an SC* liquid crystal composition containing from about 10 to about 30% by weight of the compound of formula (I) to easily obtain a cell containing a uniformly aligned monodomain.

The present invention is now illustrated in greater detail with reference to the following Examples, but it should be understood that the present invention is not deemed to be limited thereto. In these examples, all the percents are by weight unless otherwise indicated.

EXAMPLE 1

Synthesis of 4-[(S)-1-methylheptyloxycarbonyl]phenyl 4'-[(S)-2-propoxypropanoyloxy]biphenyl-4-carboxylate:

(1-a) Synthesis of 4'-[(S)-2-propoxypropanoyloxy]biphenyl-4-carboxylic acid

Twenty grams of ethyl (S)-lactate, 45.0 g of propyl iodide, and 30.0 g of silver oxide were stirred in 100 ml of dimethylformamide for 40 hours. Any insoluble matter was removed by filtration, and water was added to the filtrate. The filtrate was extracted three times with hexane. The hexane layer was dehydrated, and the organic solvent was removed therefrom by distillation under reduced pressure to obtain 20.0 g of ethyl (S)-2-propoxypropionate (b.p.=78° C./50 mmHg). Eighteen grams of the product was stirred in 100 ml of a 5N sodium hydroxide aqueous solution for 6 hours, and adjusted to a pH of 3 to 4 with dilute sulfuric acid under ice-cooling. The reaction mixture was extracted with diethyl ether several times, and the extract was dehydrated and distilled to remove the diethyl ether to obtain 10.2 g of (S)-2-propoxypropionic acid. To the whole quantity of the product were added 20 ml of thionyl chloride and 0.5 ml of pyridine, followed by stirring at reflux for 2 hours. The excess thionyl chloride was removed from the reaction mixture by distillation under reduced pressure. The residue was dissolved in benzene, and any insoluble matter was separated by filtration. The benzene was removed from the filtrate by distillation to obtain 10.5 g of (S)-2-propoxypropanoyl chloride as an oily substance.

In a solution of 7.06 g of 4'-hydroxybiphenyl-4-carboxylic acid in 35 ml of pyridine and 20 ml of methylene chloride was added dropwise 5.27 g of the acid chloride. After completion of the dropwise addition, the mixture was allowed to react at reflux for 6 hours. After completion of the reaction, a small amount of ethanol was added thereto to esterify any unreacted acid chloride. The reaction mixture was made weakly acidic with dilute hydrochloric acid and then extracted with diethyl ether. The solvent was removed from the extract by distillation, and to the resulting crude crystals was added a mixed solvent of n-hexane and diethyl ether, followed by heating at reflux. After removal of insoluble 4'-hydroxybiphenyl-4-carboxylic acid, the mixture was cooled to 5° to 10° C., and the precipitated crystals were collected by filtration. The most of the diesterified product remained in the filtrate. The crystallization operation was further repeated to finally obtain 4.48 g of 4'-[(S)-2-propoxypropanoyloxy]biphenyl-4-carboxylic acid.

The compound exhibited a liquid crystal phase and had a melting point of 155° C. and a transparent point of 220° C.

(1-b) Synthesis of Entitled Compound

Fifteen milliliters of thionyl chloride was added to 4.48 g of the carboxylic acid obtained in (1-a), and 2 ml of pyridine was added thereto while stirring. After dissolving, the solution was heated at 40° to 50° C. for 3 hours. The excess thionyl chloride was removed by distillation, and to the residue was added toluene, followed by thoroughly stirring. Any insoluble matter was removed by filtration, and the solvent was removed from the filtrate by distillation to obtain 4.50 g of 4'-[(S)-2-propoxypropanoyloxy]biphenyl-4-carbonyl acid chloride as an oily substance.

In 5 ml of methylene chloride was dissolved 210 mg of the acid chloride, and to the solution was added 5 ml of a methylene chloride solution containing 157 mg of (S)-1-methylheptyl 4-hydroxybenzoate. To the mixture was added 0.5 ml of pyridine, and the mixture was allowed to react at 35° C. for 3 hours. After allowing to cool, 100 ml of diethyl ether was added thereto, and the reaction mixture was washed successively with a 10% hydrochloric acid aqueous solution, a saturated sodium bicarbonate aqueous solution, water, and a saturated sodium chloride aqueous solution.

After dehydration over anhydrous sodium sulfate, the solvent was removed by distillation. The residue was subjected to silica gel column chromatography using a hexane-diethyl ether mixed solvent as a developing solvent. Recrystallization from ethanol gave 127 mg of the entitled compound as white crystals.

The resulting compound exhibited liquid crystal properties. The phase transition temperatures of the compound are shown in Table 1 above.

EXAMPLES 2 AND 3

3-Fluoro-4-[(S)-1-methylheptyloxycarbonyl]phenyl 4-[(S)-2-propoxypropanoyloxy]biphenyl-4-carboxylate (Example 2) and 4-[(R)-1-methylheptyloxycarbonyl]phenyl 4'-[(S)-2-propoxypropanoyloxy]biphenyl-4-carboxylate (Example 3) were obtained in the same manner as in Example 1, except for replacing (S)-1-methylheptyl 4-hydroxybenzoate with (S)-1-methylheptyl 2-fluoro-4-hydroxybenzoate or (R)-1-methylheptyl 4-hydroxybenzoate, respectively.

EXAMPLE 4

Synthesis of
4'-[(S)-1-methylheptyloxycarbonyl]biphenyl-4-yl
4-[(S)-2-propoxypropanoyloxy]benzoate (S)-2-Propoxypropanoyl chloride (4.96 g) obtained as an intermediate in (1-a) of Example 1 was reacted with 4-hydroxybenzoic acid to obtain 3.45 g of 4-[(S)-2-propoxypropanoyloxy]benzoic acid as white crystals having a melting point of 84° C.

The resulting carboxylic acid (2.45 g) was reacted with 10 ml of thionyl chloride and 0.2 ml of pyridine to obtain 2.61 g of 4-[(S)-2-propoxypropanoyloxy]benzoyl chloride.

The acid chloride thus obtained (150 mg) was then reacted with 195 mg of (S)-1-methylheptyl 4'-hydroxybiphenyl-4-carboxylate in the same manner as in (1-b) of Example 1, and the product was purified by column chromatography using a hexane-chloroform mixture as a developing solvent. Recrystallization from ethanol yielded 227 mg of the entitled compound as white crystals.

EXAMPLE 5

4'-[(S)-1-Methylheptyloxycarbonyl]biphenyl-4-yl 3-fluoro-4-[(S)-2-octyloxypropanoyloxy]benzoate was obtained as white crystals in the same manner as in Example 4, except for replacing 4-hydroxybenzoic acid with 3-fluoro-4-hydroxybenzoic acid and replacing (S)-2-propoxypropanoyl chloride with (S)-2-octyloxypropanoyl chloride.

EXAMPLE 6

Synthesis of
4'-[(S)-2-propoxypropanoyloxy]biphenyl-4-yl-4-[(S)-1-methylheptyloxycarbonyl)benzoate

(6-a) Synthesis of
4'-[(S)-2-propoxypropanoyloxy]biphenyl-4-ol

In a mixture of 14 ml of pyridine and 6 ml of methylene chloride was dissolved 2.70 g of 4,4'-biphenol, and to the solution was added dropwise a solution of 1.10 g of (S)-2-propoxypropionoyl chloride obtained in (1-a) in 8 ml of methylene chloride. After the dropwise addition, the mixture was stirred at reflux for 4 hours. After allowing to cool, diethyl ether was added thereto, and the mixture was washed successively with a 10% hydrochloric acid aqueous solution, water, and a saturated sodium chloride aqueous solution. The mixture was dried over anhydrous sodium sulfate, and the solvent was removed by distillation. The resulting crude crystals were purified by silica gel column chromatography using a hexane-ethyl acetate mixture as a developing solvent to obtain 1.32 g of 4'-[(S)-2-propoxypropanoyloxy]biphenyl-4-ol.

When recrystallized from n-hexane, the melting point was 120° C.

(6-b) Synthesis of Entitled Compound

To 7.50 g of terephthalaldehydic acid (4-formylheuzoic acid) were added 20 ml of thionyl chloride and 1 ml of pyridine, followed by heating under stirring. After the reaction mixture became clear, stirring was further continued at reflux for 4 hours, followed by allowing to cool. The excess thionyl chloride was removed by distillation under reduced pressure, toluene was added to the residue, and any insoluble matter was separated by filtration. The toluene was removed from the filtrate by distillation to obtain 7.91 g of 4-formylbenzoyl chloride.

The resulting acid chloride (3.51 g) was reacted with 2.86 g of (S)-2-octanol in methylene chloride in the presence of pyridine to obtain 5.71 g of (S)-1-methylheptyl ester as a crude oily product. The product was dissolved in 40 ml of acetic acid, and 2.5 g of chromic anhydride dissolved in 2.5 ml of water and 5 ml of acetic acid was added dropwise to the solution at 50° to 60° C. One hour later, the reaction mixture was poured into ice-water. The white precipitate thus formed was collected by filtration and purified by silica gel column chromatography to obtain 4-[(S)-1-methylheptyloxycarbonyl]benzoic acid, which as then treated with thionyl chloride to obtain 4-[(S)-1-methylheptyloxycarbonyl]benzoyl chloride.

To 340 mg of the resulting acid chloride was added a solution of 350 mg of 4'-[(S)-2-propoxypropanoyloxy]-biphenyl-4-ol obtained in (6-a) in 10 ml of methylene chloride, and 1 ml of pyridine was further added thereto. The mixture was allowed to react at reflux for 2 hours. The reaction mixture was worked up and purified in the same manner as in Example 1 to obtain 250 mg of the entitled compound.

EXAMPLES 7 AND 8

4'-[(S)-2-Propoxypropanoyloxy]biphenyl-4-carbony chloride obtained as an intermediate in (1-a) of Example 1 was reacted with (S)-2-octanol or (S)-2-hexanol to obtain 4'-[(S)-1-methylheptyloxycarbonyl]-biphenyl-4-yl (S)-2-propoxypropanoate (Example 7) or 4'-[(S)-1-methylpentyloxycarbonyl]biphenyl-4-yl (S)-2-propoxypropanoate (Example 8), respectively.

EXAMPLE 9

4-[(S)-2-Methyl butoxycarbonyl]phenyl 4'-[(S)-2-propoxypropanoyloxy]biphenyl-4-carboxylate was obtained in the same manner as in Example 1, except for replacing (S)-1-methylheptyl 4-hydroxybenzoate as used in Example 1 with 4-[(S)-2-methylbutoxycarbonyl]phenol synthesized from (S)-2-methylbutanol and 4-hydroxybenzoic acid.

The compound per se had a PS value of 120 nC/cm$^2$ at $T-T_c=10°$ C.

EXAMPLE 10

3-Fluoro-4-[(S)-2-methylbutoxycarbonyl]phenyl 4'-[(S)-2-propoxypropanoyloxy]biphenyl-4-carboxylate was obtained in the same manner as in Example 1, except for replacing (S)-1-methylheptyl 4-hydroxybenzoate as used in Example 1 with 3-fluoro-4-[(S)-2-methylbutoxycarbonyl]phenol which was synthesized from 2-fluoro-4-hydroxybenzoic acid and (S)-2-methylbutanol in the presence of a sulfuric acid catalyst.

EXAMPLE 11

4-[(S)-2-Propoxypropanoyloxy]benzoic acid was synthesized in the same manner as in Example 1, except for replacing 4'-hydroxybiphenyl-4-carboxylic acid as used in Example 1 with p-hydroxybenzoic acid. The resulting compound was reacted with 4'-[(S)-2-methylbutoxycarbonyl]biphenyl-4-ol to obtain 4'[(S)-2-methylbutoxycarbonyl]biphenyl-4-yl 4-[(S)-2-propoxypropanoyloxy]benzoate.

EXAMPLE 12

Synthesis of 4-[(S)-2-methylbutoxycarbonyl]phenyl 4-[(S)-2-propoxypropanoyloxy]benzoate In 12 ml of methylene chloride were dissolved 107 mg of 4-[2-(S)-propoxypropanoyloxy]benzoic acid, 95 mg of 4-[(S)-2-methyl butoxycarbonyl]phenol, and 140 mg of dicyclohexylcarbodiimide, and a catalytic amount of 4-dimethylaminopyridine was added to the solution, followed by stirring at room temperature. After 5 hours, diethyl ether was added to the reaction mixture, and any insoluble matter was removed by filtration. The filtrate was washed successively with a 10% hydrochloric acid aqueous solution, a saturated sodium bicarbonate aqueous solution, water, and a saturated sodium chloride aqueous solution, and dried over sodium sulfate. The solvent was removed from the residue by distillation, and the resulting oily substance was purified by silica gel column chromatography to obtain 139 mg of the entitled compound as a transparent oily substance. This compound did not crystalize even when allowed to stand at room temperature or less for a long time. The structure of the compound was confirmed by NMR and IR spectra.

EXAMPLE 13

4-[(S)-2-Methylbutoxycarbonylmethyl]phenyl 4'-[(S)-2-propoxypropanoyloxy]biphenyl-4-carboxylate obtained as white crystals in the same manner as Example 1, except for replacing (S)-1-methylheptyl-4-hydroxybenzoate as used in Example 1 with (S)-2-methylbutyl 4-hydroxyphenylacetate synthesized from 4-hydroxyphenylacetic acid and (S)-2-methylbutanol.

EXAMPLE 14

4-[2-((S)-methylbutoxycarbonyl)ethyl]phenyl 4'-[(S)-2-propoxypropanoyloxy]biphenyl-4-carboxylate was obtained as white crystals in the same manner as in Example 1, except for replacing (S)-1-methylheptyl-4-hydroxybenzoate as used in Example 1 with (S)-2-methylbutyl 3-(4-hydroxyphenyl)propionate synthesized from 3-(4-hydroxyphenyl)propionic acid and (S)-2-methylbutanol.

EXAMPLE 15

Synthesis of
4'-[(S)-2-methyloctyloxycarbonyl]biphenyl-4-yl
4-[(S)-2-propoxypropanoyloxy]benzoate 4'-Acetoxybiphenyl-4-carboxylic acid (5.80 g) was converted to an acid chloride using thionyl chloride, and the acid chloride was reacted with (S)-2-methyloctanol. The reaction mixture was extracted with diethyl ether, and the ethereal layer was thoroughly dried. Benzylamine was added thereto in small portions at room temperature. Hydrochloric acid was further added thereto, and the mixture was washed with water. The solvent was removed from the reaction mixture by distillation, and the resulting crude product was decolored by passing through a silica gel column (solvent: n-hexane-ethyl acetate mixture) and recrystallized from n-hexane to obtain 6.2 g of (S)-2-methyloctyl 4'-hydroxybiphenyl-4-carboxylate as white crystals having a melting point of 89° C.

The entitled compound was prepared in the same manner as in Example 11, except for replacing 4'-[(S)-2-methylbutoxycarbonyl]biphenyl-4-ol as used in Example 11 with the above-obtained carboxylate.

EXAMPLE 16

Synthesis of
4'-[(S)-2-propoxypropanoyloxy]biphenyl-4-yl
4-[(S)-2-methylbutoxycarbonyl]benzoate:

Commercially available terephthalaldehydric acid was reacted with thionyl chloride and a small amount of pyridine in methylene chloride under heating to obtain an acid chloride. (S)-2-Methylbutanol was added to the acid chloride to obtain (S)-2-methylbutyl 4-formylbenzoate. The product was dissolved in acetic acid, and a chromic anhydride aqueous solution was dropwise added to the solution at 30° to 40° C. Methanol was added to the reaction mixture and, after the system turned green, the mixture was poured into ice-water and extracted with diethyl ether. After washing with water, the extract was concentrated, and the concentrate was recrystallized from hexane to obtain 4-[(S)-2-methylbutoxycarbonyl]benzoic acid.

The resulting carboxylic acid was treated with thionyl chloride to obtain 4-[(S)-2-methylbutoxycarbonyl]-benzoyl chloride.

The entitled compound was obtained in the same manner as in Example 6, except for replacing 4-[(S)-1-methylheptoxycarbonyl]benzoyl chloride as used in Example 6 with the above-obtained acid chloride.

EXAMPLE 17

Synthesis of 4-[(S)-3-methylpentyloxycarbonyl]phenyl 4'-[(S)-2-propoxypropanoyloxy]biphenyl-4-carboxylate In the same manner as in Example 15, (S)-3-methylpentyl 4-hydroxybenzoate was prepared from (S)-3-methylpentanol and 4-acetoxybenzoic acid.

The entitled compound was obtained in the same manner as in Example 1, except for replacing (S)-1-methylheptyl 4-hydroxybenzoate with the above prepared benzoate.

EXAMPLE 18

4'-[(S)-2-propoxypropanoyloxy]biphenyl-4-carbonyl chloride obtained as an intermediate in Example 1 was reacted with (S)-3-methylpentanol in methylene chloride and pyridine to obtain 4'-[(S)-3-methylpentyloxy]-biphenyl-4-yl (S)-2-propoxypropionate as an oily product. This compound did not crystallize when allowed to stand at room temperature or less for a long time.

EXAMPLE 19.

An SC* liquid crystal composition consisting of 85.0% of the pyrimidine-phenylbenzoate-based mother liquid crystal (A) and 15.0% of the compound obtained in Example 1 was prepared. This composition exhibited an SC* phase at 54° C. or lower, an SA phase at 69° C. or lower, and an N* phase at 70.5° C. or lower and became an isotropic liquid phase at temperature higher than that. The SC* liquid crystal composition had a PS value of 13.5 nC/cm² at 34° C. (T−T$_c$=20°), 14.8 nC/cm² at 30° C. (T−T$_c$=25°), and 15.5 nC/cm² at 26° C.

The SC* liquid crystal composition was heated to 75° C. to become an isotropic liquid phase and inserted between a pair of transparent glass electrodes (one of which had been subjected to alignment treatment of polyimide coating and rubbing) spaced by 2.2 μm thick spacers to form a thin film cell. The cell was gradually cooled at a cooling rate of 5° C./min to align the N* phase and SA phase to thereby obtain a monodomain of the SC* phase at 54° C. or lower.

A square wave of 22 V, 50 Hz was applied to the cell, and the intensity of transmitted light was measured. As a result, the cell exhibited excellent response performance as having a response rate of 46 μsec at 30° C. and 51 μsec at 26° C., with the tilt angle being 21.7° and 23.3°, respectively.

EXAMPLE 20

An SC* liquid crystal composition was prepared from 85.0% of the mother liquid crystal (A) and 15.0% of the compound obtained in Example 3. The phase transition temperatures of the composition were the same as those of the composition of Example 19. However, the helix of the N* phase at 69.5° C. was right-handed and had a pitch of 0.83 μm, and the spontaneous polarization was extremely small as having a PS value of 0.2 nC/cm² or less at 25° C.

A 2.1 μm thick liquid crystal cell was prepared in the same manner as in Example 19, except for using the above prepared SC* liquid crystal composition. When a 21 V 50 Hz square wave was applied to the cell, the response time was 1.13 msec at 28° C., significantly slower as compared with Example 19, and the angle of tilt at this time was 18.5°.

EXAMPLE 21

An SC* liquid crystal composition was prepared from 85.0% of the mother liquid crystal (A) and 15.0% of the compound obtained in Example 6. The composition exhibited an SC* phase at 58° C. or lower, an SA phase at 60° C. or lower, and an N* phase at 68.5° C. or lower and became an isotropic liquid at temperatures higher than that. The helical pitch of the N* phase at 60.5° C. was 2.40 μm, and the PS values were 16.4 nC/cm² at 38° C. (T−T$_c$=20°) and 17.9 nC/cm² at 27° C., showing further improvements over the composition of Example 19.

A 2.5 μm thick liquid crystal cell was prepared in the same manner as in Example 19, except for using the above prepared SC* liquid crystal composition. When a 25 V 50 Hz square wave was applied to the cell, the response time was 37 μsec at 27° C., indicating markedly rapid response. The tlt angle at this time was 29.4°.

EXAMPLE 22

An SC* liquid crystal composition was prepared from 81.5% of the mother liquid crystal (A), 7.0% of the compound obtained in Example 1, and 11.5% of 4-[(R)-1-methylheptyloxy]phenyl 4-[(S)-2-propoxypropanoyloxy]biphenyl-4-carboxylate. This composition exhibited an SC* phase at 58° C. or lower, an SA phase at 65.5° C. or lower, and an N* phase at 69° C. or lower and became an isotropic liquid at temperatures higher than that. The helical pitch of the N* phase at 66° C. was as large as 26 μm. The PS values were 16.0 nC/cm² at 38° C. (T−T$_c$=20°), 17.2 nC/cm² at 33° C. (T−T$_c$=25°), and 18.5 nC/cm² at 25° C.

A 2.5 μm thick liquid crystal cell was prepared in the same manner as in Example 19, except for using the above prepared SC* liquid crystal composition. When a 23 V 50 Hz square wave was applied to the cell, the response time was 43 μsec at 25° C., with the angle of tilt being 28.3°.

Since the SC* liquid crystal composition exhibited markedly excellent alignment because of the long pitch of the N* phase in the vicinity of the N* SA transition point, the cell provided a higher contrast than obtained by the cells of Examples 20 and 21.

EXAMPLE 23

An SC liquid crystal composition consisting of 4-[5-octylpyrimidine-2-yl ]phenyl 4-decylbenzoate, 2-(4-hexylbenzyloxy)-5-(4-heptylphenyl)pyrimidine, 4-octylphenyl 4-decylbenzoate, and 4-heptylphenyl 4-decylbenzoate at a weight ratio of 35:15:15:15 was mixed with 5% of the compound obtained in Example 1, 10% of 4-[(R)-1-methylheptyloxy ]phenyl 4- [( S ) -2-propoxypropanoyloxy]biphenyl-4-carboxylate, and 5% of 4-octylphenyl 4-[(S)-2-methylbutoxy]benzoate (for minute control of pitch) based on the total weight of the resulting composition. The resulting composition exhibited an SC* phase at 47° C. or lower, an SA phase at 52° C. or lower, and an N* phase at 73° C. or lower and became an isotropic liquid at temperatures higher composition and 25% of the compound obtained in Example 3.

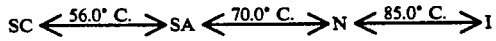

Mother Liquid Crystal (C):

- n-C$_{10}$H$_{21}$—⬡—COO—⬡—⬡(N,N)—n-C$_6$H$_{13}$    33.5 wt %
- n-C$_7$H$_{15}$—⬡—⬡(N,N)—OCH$_2$—⬡—n-C$_6$H$_{13}$    33.5 wt %
- n-C$_{10}$H$_{21}$—⬡—COO—⬡—n-C$_8$H$_{17}$    33 wt % than that. The helical pitch in the N* phase was 16 μm at 59° C., and that at 54° C. or lower was too long to measure. The PS value was 14.8 nC/cm$^2$ at 27° C. ($T-T_c=20°$).

A 2.2 μm thick liquid crystal cell was prepared in the same manner as in Example 19, except for using the above prepared SC* liquid crystal composition. When a 22 V 50 Hz square wave was applied to the cell, the response time was 91 μsec at 25.5° C., with the tilt angle being 23.7°. The contrast of the cell was as very high as in Example 22.

EXAMPLE 24

An SC* liquid crystal composition consisting of the mother liquid crystal (A) and 25% of the compound obtained in Example 9 was prepared. The composition exhibited an SC* phase at 54.5° C. or lower, an SA phase at 73.5° C. or lower, and an N* phase at 78° C. of lower.

A 1.9 μm thick liquid crystal cell was prepared in the same manner as in Example 19, except for using the above prepared SC* liquid crystal composition. When a 19 V 50 Hz square wave was applied to the cell, the response time was 96 μsec at 25° C., with the angle of tilt being 19.9°. The PS value was found to be 8.57 nC/cm$^2$. The pitch of the N* phase was sufficiently long to provide a satisfactory contrast.

EXAMPLE 25

A liquid crystal cell was prepared in the same manner as in Example 24, except for using only the compound obtained in Example 10. The cell exhibited satisfactory alignment and a high response time of 104 μsec at 28° C. The PS value at that temperature was 162 nC/cm$^2$.

EXAMPLE 26

An SC* liquid crystal composition was prepared, consisting of each of the mother liquid crystal (A) and (B) and a mother liquid crystal (C) having the following The phase transition temperatures of the mother liquid crystal (C) are shown below.

$$SC \xleftrightarrow{56.0° C.} SA \xleftrightarrow{70.0° C.} N \xleftrightarrow{85.0° C.} I$$

Each of the resulting SC* liquid crystal compositions was determined for phase transition temperatures, response time at 25° C. or 30° C., and PS value at 25° C., and the results obtained are shown in Table 3 below.

TABLE 3

| SC* Liquid Crystal Composition | Mother Liquid Crystal | Phase and Phae Transition Temp. (°C.) | | | | Response Time (μsec) | | PS value (nC/cm$^2$) |
|---|---|---|---|---|---|---|---|---|
| | | SC* | SA | N* | I | 25° C. | 30° C. | |
| 26-a | (A) | • 59.0 | • 66.5 | • 74.0 | • | 63 | 51 | 8.6 |
| 26-b | (B) | • 70.0 | • 84.0 | • 104.0 | • | 40 | 35 | 15.7 |
| 26-c | (C) | • 59.5 | • 71.0 | • 84.0 | • | 73 | 69 | 11.8 |

EXAMPLE 27

An SC* liquid crystal composition was prepared from the mother liquid crystal (A) and 10% of the compound obtained in Example 13. This composition exhibited an SC* phase at 57° C. or lower and an N* phase at 70° C. or lower. The helical pitch of the SC* phase was extremely long. The helix of the N* phase was right-handed and had a pitch of 3.8 μm which underwent substantially no change with temperature. The polarity of spontaneous polarization was ⊕.

EXAMPLE 28

An SC* liquid crystal composition consisting of the mother liquid crystal (A) and 10% of the compound obtained in Example 14 was prepared. The composition exhibited an SC* phase at 58° C. or lower, an SA phase at 64° C. or lower, and an N* phase at 72.5° C. The helix of the N* phase was right-handed and had a pitch of 3.4 μm at 70° C., and the polarity of spontaneous polarization was ⊕.

EXAMPLE 29

An SC* liquid crystal composition consisting of the mother liquid crystal (A) and 18% of the compound obtained in Example 17 was prepared. The composition exhibited an SC* phase at 57.5° C. or lower, an SA phase at 72.5° C. or lower, and an N* phase at 74.5° C. or lower. The helix of the N* phase was right-handed and had a pitch of 3.8 μm, which underwent substantially no change with temperature.

As described above, the compounds according to the present invention exhibits extremely large spontaneous polarization either alone or as in an SC* liquid crystal composition. They induce a great helical pitch, particularly in the N* phase and are therefore very easy to control the helical pitch thereof for use as an SC liquid crystal compound or as a component of an SC* liquid crystal composition.

Further, as demonstrated in the foregoing Examples, the compounds of the present invention can be prepared with industrial ease. They are colorless per se, excellent in chemical stability against light, moisture, heat, and other environmental conditions, and hence very suitable for practical use.

Furthermore, the ferroelectric liquid crystal compounds of the present invention or compositions containing them exhibit satisfactory orientation and provide response at a rate 100 times or more higher than the response rate attained by conventional nematic liquid crystals. They are therefore extremely useful as materials of liquid crystal devices.

While the invention has been described in detail and with reference to specific embodiments thereof, it will be apparent to one skilled in the art that various changes and modifications can be made therein without departing from the spirit and scope thereof.

What is claimed is:

1. A compound represented by formula (I):

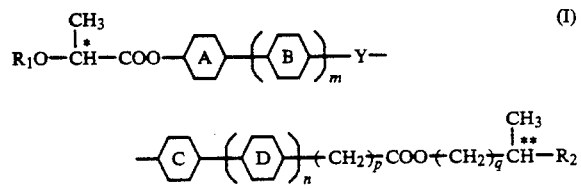

wherein $R_1$ represents an alkyl group having from 1 to 18 carbon atoms; $R_2$ represents an alkyl group having from 2 to 16 carbon atoms; rings A, B, C and D each represent a 1,4-phenylene group or a 1,4-phenylene group having one or two halogen atoms; Y represents a single bond —C(=O)—O—, or —OC(=O)—; m and n each represents 0 or 1 and m+n equals 1 or 2; p represents 0, 1, or 2; q represents 0 or an integer of from 1 to 6; and C* and C** each represents an asymmetric carbon atom in an (S)-configuration or C* and C** each represents an asymmetric carbon atom in an (R)-configuration.

2. A compound of claim 1, wherein the rings B and D each represents a 1,4-phenylene group.

3. A compound of claim 2, wherein the rings A and C each represents a 1,4-phenylene group.

4. A compound of claim 3, wherein Y is —C(=O)—O—.

5. A compound of claim 4, wherein m is 1, and n is 0.

6. A compound of claim 5, wherein p and q each is 0.

7. A compound of claim 5, wherein p is 0, and q is 1.

8. A compound of claim 5, wherein p is 0, and q is 2.

9. A compound of claim 5, wherein p and q each is 1.

10. A compound of claim 5, wherein p is 2, and q is 1.

11. A compound of claim 4, wherein m is 0, and n is 1.

12. A compound of claim 11, wherein p and q each is 0.

13. A compound of claim 11, wherein p is 0, and q is 1.

14. A compound of claim 11, wherein p is 0, and q is 1.

15. A compound of claim 3, wherein Y is —OC(=O)—.

16. A compound of claim 15, wherein m is 1, and n is 0.

17. A compound of claim 16, wherein p an q each is 0.

18. A compound of claim 16, wherein p is 0, and q is 1.

19. A compound of claim 3, wherein Y is a single bond.

20. A compound of claim 19, wherein p and q each is 0.

21. A compound of claim 19, wherein p is 0, and q is 2.

22. A compound of claim 2, wherein the ring A is a 1,4-phenylene group, and the ring C is

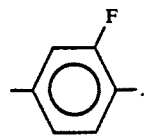

23. A compound of claim 22, wherein Y is —C(=O)—O—.

24. A compound of claim 23, wherein m is 1, and n is 0.

25. A compound of claim 24, wherein p and q each is 0.

26. A compound of claim 24, wherein p is 0, and q is 1.

27. A compound of claim 2, wherein the ring A is

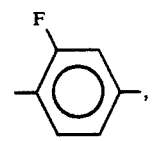

and the ring C is a 1,4-phenylene group.

28. A compound of claim 27, wherein Y is —C(=O)—O—.

29. A compound of claim 28, wherein m is 0, and n is 1.

30. A compound of claim 29, wherein p and q each is 0.

31. A liquid crystal composition containing a compound represented by formula (I):

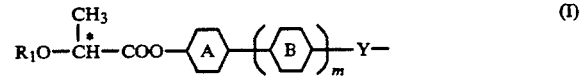
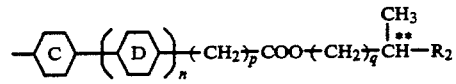

wherein $R_1$ represents an alkyl group having from 1 to 18 carbon atoms; $R_2$ represents an alkyl group having from 2 to 16 carbon atoms; rings A, B, C and D each represent a 1,4-phenylene group or a 1,4-phenylene group having one or two halogen atoms; Y represents a single bond, —C(=O)—O— or —OC(=O)—; m and n each represents 0 or 1 and m+n equals 1 to 2; p represents 0, 1, or 2; q represents 0 or an integer of from 1 to 6; and C* and C** each represents an asymmetric carbon atom in an (S)-configuration or C* and C** each represents an asymmetric carbon atom in an (R)-configuration.

32. A liquid crystal composition as claimed in claim 31, wherein said composition exhibits a ferroelectric chiral smectic phase.

* * * * *